United States Patent [19]
Tanikoshi

[11] 3,940,670
[45] Feb. 24, 1976

[54] SPEED CONTROL APPARATUS FOR A D.C. MOTOR HAVING HALL GENERATORS

[75] Inventor: Kinji Tanikoshi, Kawasaki, Japan

[73] Assignee: Canon Kabushiki Kaisha, Tokyo, Japan

[22] Filed: Sept. 4, 1974

[21] Appl. No.: 503,087

[30] Foreign Application Priority Data
  Sept. 7, 1973   Japan.................... 48-100835

[52] U.S. Cl........................... 318/254; 318/269
[51] Int. Cl.²........................ H02K 29/02
[58] Field of Search................ 318/254, 269

[56]        References Cited
        UNITED STATES PATENTS
3,663,877   5/1972   Clark .................. 318/254
3,783,359   1/1974   Malkiel ................ 318/254
3,806,783   4/1974   Lodochnikov ........... 318/254 X

*Primary Examiner*—B. Dobeck
*Attorney, Agent, or Firm*—Toren, McGeady and Stanger

[57]            ABSTRACT

A speed control apparatus for use with a brushless direct current motor having Hall elements, which permits the associated motor to quickly regain the reference speed, or permits more uniform speed control of the motor than was conventionally possible.

9 Claims, 4 Drawing Figures

SPEED CONTROL APPARATUS FOR A D.C. MOTOR HAVING HALL GENERATORS

BACKGROUND OF THE INVENTION

1. Field of the Invention

The invention relates to a speed control apparatus for maintaining a brushless direct current motor at a predetermined speed, and, more particularly, to a speed control apparatus for a brushless direct current motor of the type having Hall elements arranged upon detection of the angular position of a permanent magnet rotor to provide Hall voltages induced therein. The Hall elements control a transistor drive circuit for successive energization of the field coils. There are provide, in the apparatus, a signal generator for generating a reference signal corresponding to a desired speed, detecting means for detecting the output signal from said generator and the Hall voltage difference from said Hall elements, and supply means for supplying a counter-EMF developed across a field coil of the motor during an interval of deenergization thereof in reversed relationship to the drive current when the output signal from said detecting means is larger than a predetermined value. The supply means are arranged so that when the output signal from said detecting means exceeds the predetermined value, a field coil to be energized is supplied with a drive current from said drive circuit and with the counter-EMF from said supply means.

2. Description of the Prior Art

A conventional speed control apparatus for maintaining a brushless D.C. motor at a predetermined speed makes use of Hall elements arranged upon detection of the angular position of a permanent magnet rotor to provide voltages induced therein which control a transistor drive circuit for successive energization of the field coils. However, such a conventional apparatus has a drawback that when the speed of the D.C. motor exceeds a desired speed due to fluctuation in the load being driven, a considerably long time interval is required until the motor regains the reference speed.

SUMMARY OF THE INVENTION

An object of the present invention is to provide a speed control apparatus for use with a brushless direct current motor having Hall elements which has overcome the above-mentioned conventional drawback.

Another object of the present invention is to provide a direct current motor speed control apparatus which permits the associated motor to quickly regain the reference speed, when the speed of the motor is deviated from the reference speed, or which permits more uniform speed control of the motor than was previously possible.

Other objects and advantages will become apparent from the following description taken in conjunction with the accompanying drawings.

DESCRIPTION OF THE PREFERRED EMBODIMENT

Figure 1:
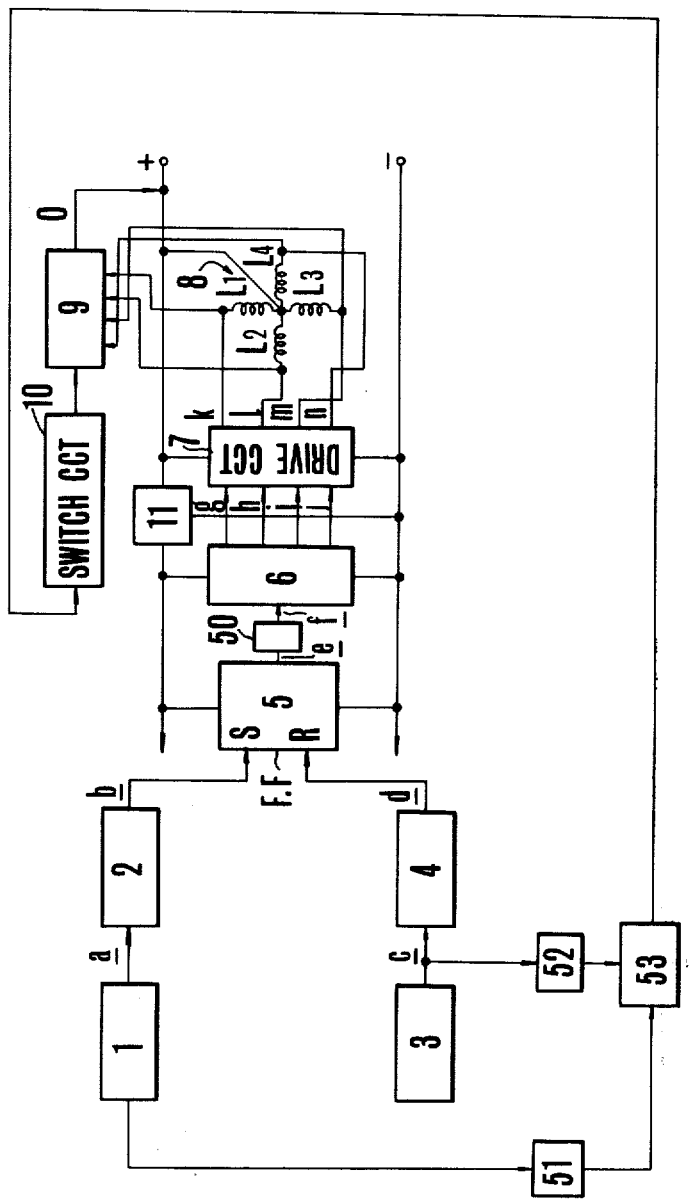
FIG. 1 is a block diagram of an embodiment of a system for maintaining a D.C. motor at a predetermined speed in accordance with the present invention.

FIG. 1 shows a preferred embodiment of a brushless direct current motor speed control system in accordance with the present invention. The system comprises a reference signal generator 1 for generating a signal having a frequency proportional to a predetermined reference speed, a differentiation and shaping circuit 2 having an input terminal connected to the generator circuit 1 for producing reference pulses occurring at equally time spaced intervals which are applied to a "set" terminal (S) of a Flip-Flop (FF) circuit 5, an alternating current tachometer 3 cooperating with a D.C. motor which is to be maintained at a predetermined speed for generating an alternating current signal having a frequency proportional to the actual motor speed, and another differentiation and shaping circuit 4 having an input terminal connected to the tachometer 3 for producing a speed-proportional pulses which are applied to a "reset" terminal (R) of the FF circuit 5. The FF circuit 5 is designed to be set on occurence of each reference pulse and to be reset on occurrence of each speed-proportional pulse. As a result, a square tooth signal with a pulse width corresponding to the phase difference between a pair of successive input pulses is produced at its output terminal which is connected to an integration circuit 50 to rectify the square tooth signal from the FF circuit 5. The parts 1 through 5 constitute a synchronization circuit for synchronizing the motor to the reference pulses. A Hall element assembly 6 comprises a plurality of Hall elements arranged on the stator 8 of the motor, upon rotation of a permanent magnet rotor, to produce output voltages which are utilized to control a motor drive circuit 7 for successive energization of the field coils L1, L2, L3 and L4 mounted on the stator 8 of the motor. Each of the field coils is connected to a summing circuit 9 in which inductive voltages effected across the field coils other than the energized coil are summed up. The system further includes a first smoothing circuit 51 having an input terminal connected to the other output terminal of the reference pulse generator 1, a second smoothing circuit 52 having an input terminal connected to the output terminal of the tachometer 3, and a comparison circuit 53 having a pair of input terminals connected to the respective output terminals of the smoothing circuits 51 and 52 and having an output terminal at which appears a direct current voltage of the level corresponding to the difference between the output voltages from the smoothing circuits 51 and 52, and which is connected to the summing circuit 9 through a switching circuit 10. Accordingly, only when the direct current voltage from the comparison circuit is not zero, the switching circuit 10 is operated to cause the output signal from the circuit 9 to flow through the energized field coil L1, L2, L3 or L4. The signs + and − indicate terminals which are to be connected to a power supply source, the voltage of the power supply being stabilized by a voltage stabilizer 11.

Figure 3:
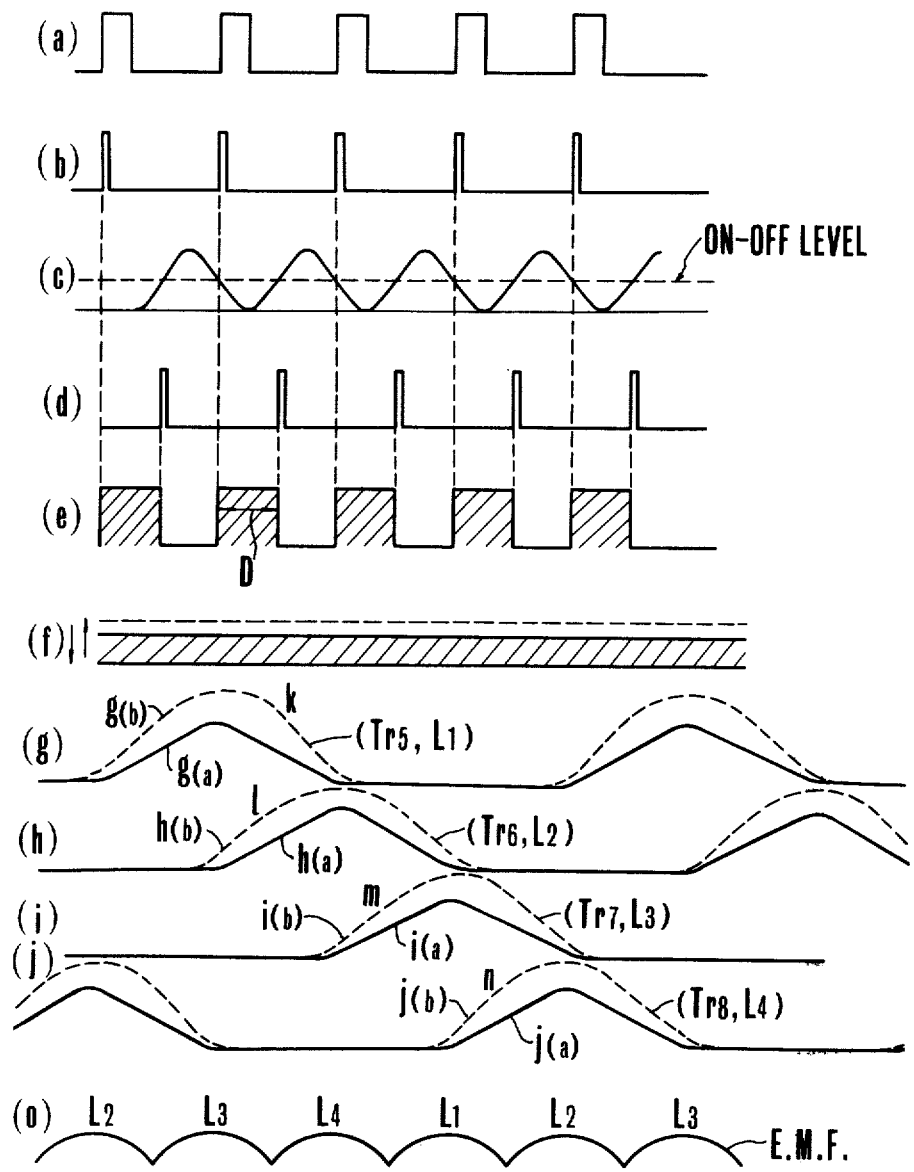
FIG. 3 is a diagram illustrating various wave forms attendant on the operation of the embodiment of FIGS. 1 and 2.
Figure 4:
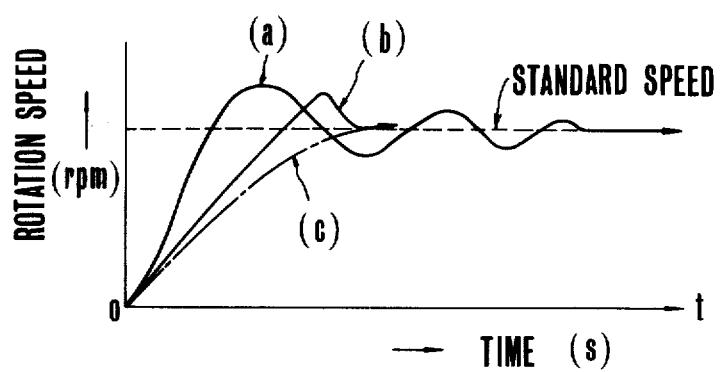
FIG. 4 is a graph illustrating speed characteristics of a D.C. motor associated with a speed control apparatus of the present invention.

The operation of the system of FIG. 1 will be described with reference to FIG. 3. At first, the reference signal generator 1 is set to provide a reference signal having a frequency corresponding to a desired speed. This reference signal (FIG. 3a) is pulsated by the differentiation and shaping circuit 2 as shown in FIG. 3b, and the equally time spaced pulses are applied to the "set" terminal of the FF circuit 5. Upon rotation of the motor which is to be maintained at the predetermined desired speed, the A.C. tachometer 3 generates a sine wave voltage signal having a frequency proportional to the actual speed of the motor as shown in FIG. 3c. This signal is pulsated by the differentiation and shaping circuit 4 as shown in FIG. 3d to produce a pulse signal having a frequency porportional to the actual speed. The FF circuit 5 is set on occurrence of each reference pulse and is reset on occurrence of each speed-proportional pulse, with the result that a square tooth signal with a pulse width corresponding to the difference between a pair of successive input pulses is produced at the output terminal of the FF circuit 5 as shown in FIG. 5e. In order to achieve the maintenance of the pulse width D constant during the operation of the motor, there is provided a motor drive control circuit including a plurality of Hall elements. The speed control system in accordance with the present invention is adapted for use with a brushless D.C. motor having the Hall elements incorporated therein which are controlled by the square tooth signal so that the motor is synchronized to the reference pulses by the FF circuit 5. In more detail, the output signal from the FF circuit 5 is rectified by the integration circuit 50 as shown in FIG. 3f, and the resulting direct current is allowed to pass through each Hall element in the Hall element assembly 6. Thereupon the Hall element produces a Hall voltage dependent upon the output signal from the integration circuit 50 as shown in FIGS. 3g through 3j. If the speed of the motor is decreased from the predetermined level with increase in the current from the integration circuit 50, each of the Hall voltages from the Hall elements increases, for example, from g(a) to g(b) as shown in FIG. 3. The Hall elements are connected to respective switching transistors in the drive circuit 7 so that the switching transistors are turned on in successive response to the Hall voltages to cause drive currents of magnitudes corresponding to the levels of the Hall voltages to flow through the field coils L1 through L4 successively. As a result, the speed of the motor gradually increases until it reaches the predetermined level. Conversely, if the speed of the motor is increased from the predetermined level, for example, by fluctuation in the load being driven, this system serves as a braking means in addition to acting in a manner similar to that described above to decrease the drive current in the field coil with decrease in the speed of the motor to the predetermined level, because the output signal from the comparison circuit 53 opens the switching circuit 10 to permit a current from the circuit 9 to flow through the energized field coil in reversed relation to the drive current from the drive circuit 7. As a result, a torque of opposite direction is suddenly produced in the motor to suddenly decrease the speed of the motor, thus the speed of the motor quickly reaches the predetermined level as shown by curve, b, in FIG. 4. When the speed of the motor has reached the predetermined level, the comparison circuit produces no more output signal to close again the switching circuit 10. In this state, the field coils are supplied with only the drive current from the drive circuit 7 to permit the motor to be driven at the predetermined speed.

Figure 2:
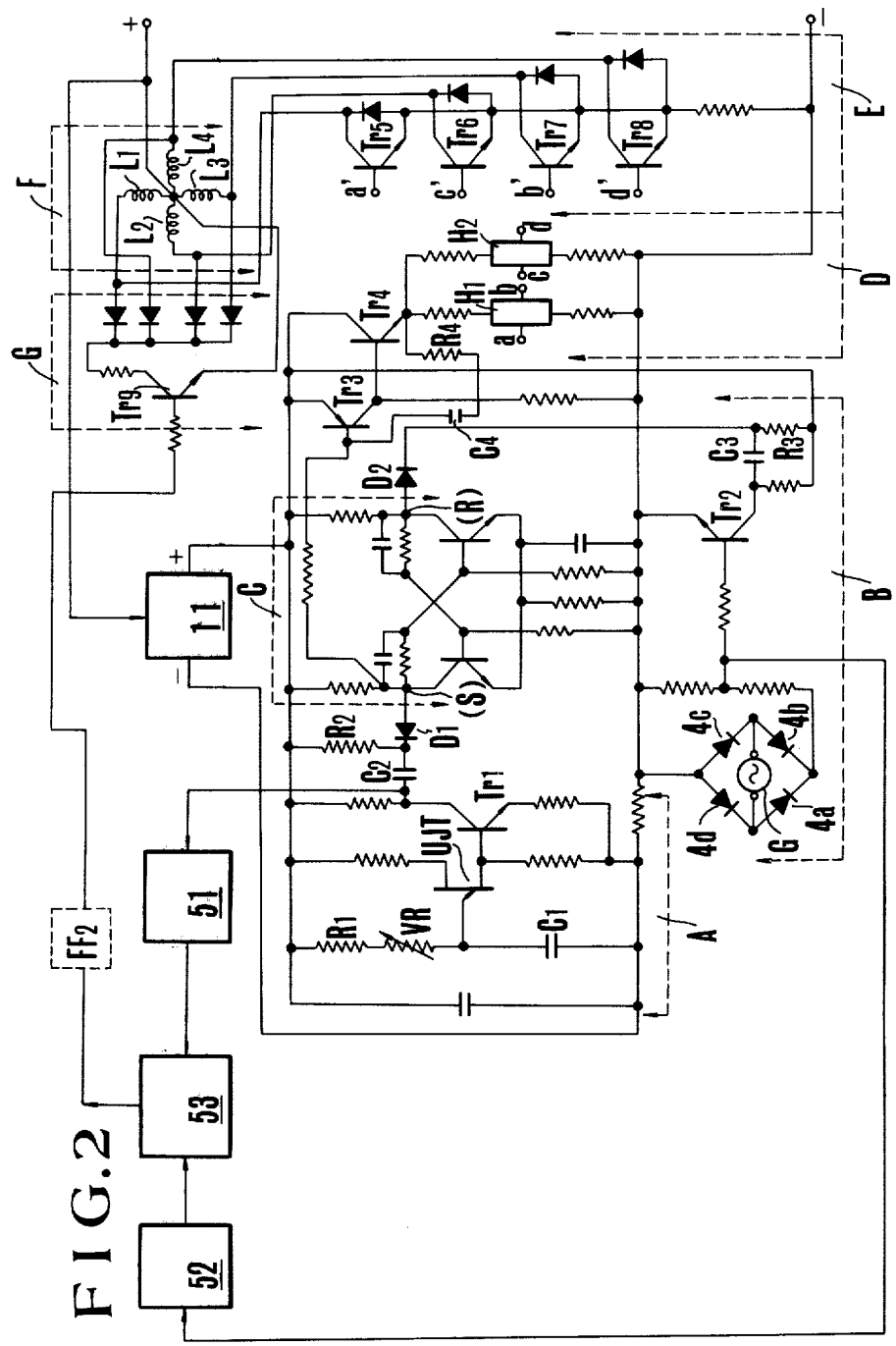
FIG. 2 is a schematic diagram, partially in block form, of an electrical circuit suitable for incorporation in the embodiment of FIG. 1.

FIG. 2 is a detailed schematic circuit diagram illustrating components within some of the blocks of FIG. 1. In a circuit section A corresponding to the blocks 1 and 2 of FIG. 1, there is a time constant circuit comprising a fixed resistor R1, a variable resistor VR and a capacitor C1 connected in a series cooperative with a unijunction transistor UJT to generate a reference signal having a frequency which is adjustable to a desired value by varying the resistance of the variable resistor VR. The reference signal is applied through a transistor Tr1 to a differentiation circuit comprising a capacitor C2 and a resistor R2, being differentiated to produce a plurality of negative pulses which are then applied through a diode D to the "set" terminal (S) of a FF circuit C. In a circuit section B corresponding to the blocks 3 and 4 of FIG. 1, the output of an A.C. tachometer G cooperating with a D.C. motor F is rectified by a bridge type full wave rectifying circuit 4a through 4d. The output from the rectifying circuit is applied through a transistor Tr2 to a differentiation circuit comprising a capacitor C3 and a resistor R3, and then to a diode D2. The diode D2 produces a plurality of speed-proportional negative pulses which are applied to the "reset" terminal (R) of the FF circuit C. The output signal from the FF circuit C is integrated by a Mirror type integration circuit comprising a capacitor C4 and a resistor R4 along with transistors Tr3 and Tr4 connected to supply leads of Hall elements H1 and H2 connected in parallel to the emitter loads of the transistor Tr4. The Hall elements H1 and H2 are arranged in the stator of the motor F upon detection of the angular position of a permanent magnet rotor (not shown) to produce Hall voltages at their output terminals, a, b, c and d as shown in FIGS. 3g through 3j. The base terminals of switching transistors Tr5 through Tr8 in a motor drive circuit E are connected to respective output terminals of the Hall elements so that the transistors Tr5 - Tr8 successively turn on in response to the positive Hall voltages to cause a drive current to flow through the field coil L1 - L4 and are summed through respective diodes D3, D4, D5 and D6 in a circuit section G. When the actual speed of the motor F is faster than the predetermined speed, the inductive voltage causes an emitter current of a switching transistor Tr9 to flow to the positive terminal of the power supply source, thereupon a braking current being added to the drive current flowing through the field coilds to produce a braking torque in the motor until the actual speed of the motor reaches the predetermined level.

Instead of using the switching transistor Tr9, it is possible to use a variable resistor for permitting a current of appropriate intensity to normally flow through the field coil L1 - L4 in a reversed direction to that of the drive current from the circuit E. In this case, a suitable braking torque is always imparted to the motor so that when the driving of the motor is initiated from the zero speed, the actual speed of the motor does not exceeds the predetermined speed as shown by curve, c, in FIG. 4. It is to be understood from the figure that the use of the variable resistor instead of the transistor Tr9 makes it possible for the speed of the motor to reach the predetermined level in a shorter time interval.

It will be seen from the foregoing description that the present invention contemplates the use of a braking circuit in the motor speed control system for permitting the motor to quickly regain the predetermined speed condition when the actual speed of the motor is caused to deviated therefrom by some reasons. Another advantage of the present invention deriving from the capability of driving the motor cycle by cycle is that the speed of the motor can be controlled with high accuracy.

Various modifications can be made within the scope of the present invention. For example, in order to prevent the speed of the motor from being decreased by its inertia from the predetermined level when the transistor Tr9 is caused to remain in the conducting state during the duration of production of a braking signal from the comparison circuit 53, there may be provided a monostable multivibrator indicated by FF 2 in FIG. 2 and connected between the input terminal of the switching circuit 10 and the output terminal of the comparison circuit 53 to be set on occurrence of a signal from the comparison circuit 53 in a time period such that the conducting time period of the transistor Tr9 is decreased from that which would be otherwise effected to decrease the braking time period. Thus overcoming the disadvantage that a considerably long time period is required for the motor to regain the predetermined speed condition. Further, instead of using a direct current differential amplifier as the comparison circuit 53 as in the apparatus shown in FIG. 2, it is possible to use a frequency comparator provided that the smoothing circuit 51 and 52 are omitted from the apparatus.

Further, in the above embodiment, the output terminal of the taco-generator 3G is connected to the input terminal of the comparision circuit 53, and the components of the motor rotation speed are detected from the output terminal of the taco-generator 3G, and thus obtained output signal is added to the comparison circuit 53. However, the components of the motor rotation speed may be detected from the output terminal of the detecting circuit 9 (in FIG. 2, the connection point of the cathode electrodes of the four diodes provided in the circuit G) which detects the voltage induced on the field coil instead of detecting them from the output terminal of the taco-generator 3G, and thus obtained output signal is added to the comparison circuit 53. Further, it is possible that the output terminal of the detecting circuit 9 is connected to the input terminal of the differentiation and shaping circuit 4, and at the same time the output terminal of the detecting circuit 9 is connected to the input terminal of the smoothing circuit 52 so as to detect the motor rotation speed from the detecting circuit 9, thus controlling the motor speed without using the taco-generator 3G.

What is claimed is:
1. A D.C. motor and control system therefor comprising:
a rotor having magnetic poles of opposite polarities thereon;
a stator having flux-producing windings positioned in torque-producing relation to said rotor;
detecting means for generating an electrical signal representing the instantaneously changing rotational speed of said D.C. motor;
reference signal generating means for generating a reference signal corresponding to a predetermined constant speed of said D.C. motor;
comparator means for comparing the electrical output signal of said detecting means with the reference signal from said reference signal generating means for providing a signal representing the difference between said two signals;
Hall generators positioned in flux-sensing relationship to said magnetic poles for detecting the instantaneous rotational speed thereof, said Hall generators generating electrical signals of a frequency representing the instantaneously changing rotational speed of said D.C. motor and of an amplitude corresponding to the output signals from said comparator means;
driving control means connected to the output of Hall generators and said stator windings for applying an exciting current to said windings in response to the output signal of said Hall generators;
motor speed detecting means which detects voltage induced in said motor windings when motor driving current does not flow in said stator windings;
switching means for supplying controlling current corresponding to the output signals from said motor detecting means to said stator windings in a direction opposite to the driving current; and
second comparator means having a first input terminal which detects electrical signals from the detecting means and a second input terminal which detects reference signals, from the reference signal generating means, and generating control signal which puts the switching means into operation when the electrical signal from the detecting means are larger than the reference signals from the reference signal generating means.

2. A D.C. motor and control system according to claim 1, in which the second comparator means comprises:
a first smoothing circuit which smooths the reference signals from the reference signal generating means;
a second smoothing circuit which smooths the electrical signals from the detecting means; and
a D.C. differential circuit which has first and second input terminals to be connected to the output terminals of the first smoothing circuit and the second smoothing circuit and generates a braking signal which brings the switching means into operative state when the level of the output signal from the second smoothing circuit is larger than the level of the output signal from the first smoothing circuit.

3. A D.C. motor and control system according to claim 1 in which the second comparator means comprises a frequency comparision means which has a first input terminal which detects the frequency of the reference signals from the reference signal generating means, and a second input terminal which detects the frequency of the electrical signals from the detecting means, and which generates a braking signal which brings the switching means into operative state when the frequency of the electrical signal from the detecting means is larger than the frequency of the reference signal from the reference signal generating means.

4. A D.C. motor and control system according to claim 1, which further comprises a pulse generating means connected between the second comparator means and the switching means for bringing the switching means into operative state for a certain time after a braking signal is generated from the second comparator means.

5. A D.C. motor and control system according to claim 1, in which the pulse generating means is a monostable multi-vibrator.

6. A D.C. motor and control system according to claim 1, in which the motor speed detecting means comprises a plurality of mono-directional conductive means connected to the windings of the stators.

7. A D.C. motor and control system according to claim 6, in which the mono-directional conductive means is a diode.

8. A D.C. motor and control system according to claim 1, in which the switching means is a transistor.

9. A D.C. motor and control system comprising, in combination:

a rotor having magnetic poles of opposite polarities thereon;

a stator having flux-producing windings positioned in torque-producing relation to said rotor;

detecting means for generating an electrical signal representing the instantaneously changing rotational speed of said D.C. motor;

reference signal generating means for generating the reference signal corresponding to a predetermined constant speed of said D.C. motor;

comparator means for comparing the electrical output signal of said detecting means with the reference signal from said reference signal generating means for providing a signal representing the difference between said two signals;

Hall generators positioned in flux-sensing relationship to said magnetic poles so as to detect the instantaneous rotational speed thereof, said Hall generators generating electrical signals of a frequency representing the instantaneously changing rotational speed of said D.C. motor and of an amplitude corresponding to the output signals from said comparator means;

driving control means connected to the output of Hall generators and said stator windings for applying an exciting current to said windings in response to the output signal of said Hall generators;

motor speed detecting means which detects voltage induced in said stator windings when motor driving current does not flow in said stator windings;

switching means for supplying controlling current corresponding to the output signals from said motor detecting means to said stator windings in a direction contrary to the driving current; and braking signal generating means which has a first input terminal for detecting the reference signal from the reference signal generating means, and a second input terminal for detecting the braking signal from the motor speed detecting means, and which generates a braking signal which brings the switching means into operative state when the braking signal from the motor speed detecting means is larger than the reference signal from the reference signal generating means.

* * * * *